United States Patent
Kauvo et al.

(10) Patent No.: US 7,412,327 B2
(45) Date of Patent: *Aug. 12, 2008

(54) PROVIDING GUIDING SERVICE BY MEANS OF A WIRELESS TERMINAL

(75) Inventors: Kimmo Esa-Tapio Kauvo, Vammala (FI); Harri Sakari Koskinen, Tampere (FI); Teppo Tapani Kivento, Tampere (FI)

(73) Assignee: Nokia Corporation, Espoo (FI)

( * ) Notice: Subject to any disclaimer, the term of this patent is extended or adjusted under 35 U.S.C. 154(b) by 0 days.

This patent is subject to a terminal disclaimer.

(21) Appl. No.: 11/606,240

(22) Filed: Nov. 29, 2006

(65) Prior Publication Data

US 2007/0150184 A1  Jun. 28, 2007

Related U.S. Application Data

(63) Continuation of application No. 10/324,312, filed on Dec. 19, 2002, now Pat. No. 7,155,338.

(30) Foreign Application Priority Data

Dec. 21, 2001 (FI) .................................. 20012562

(51) Int. Cl.
*G01C 21/30* (2006.01)
(52) U.S. Cl. ............. 701/209; 701/201; 701/207; 701/210; 340/995.12; 340/995.24; 342/357.01; 342/357.09
(58) Field of Classification Search ............. 701/200, 701/207, 208, 209, 211, 201, 210; 340/988, 340/989, 995.12, 995.24; 342/357.01, 357.09
See application file for complete search history.

(56) References Cited

U.S. PATENT DOCUMENTS 5,475,597 A   12/1995   Buck (Continued)

FOREIGN PATENT DOCUMENTS

EP   0 800 092   8/1997

(Continued)

OTHER PUBLICATIONS

Sep. 2001, 3$^{rd}$ Generation Partnership Project: Technical Specification Group Terminals; Multimedia Messaging Service (MMS): Functional description; Stage 2 (Release 4).

*Primary Examiner*—Gertrude A. Jeanglaude
(74) *Attorney, Agent, or Firm*—Hollingsworth & Funk, LLC

(57) ABSTRACT

The invention relates to a guiding system for wireless terminals. In the system, position-specific information of route points of the route on which a first wireless terminal travels is determined and it is sent to a guiding server. Supplementary data used for guiding the route are stored in the first terminal in response to a request of the user. The supplementary data are associated with the position information, and the guiding server compiles and stores route information comprising position information and supplementary data. The route information is transmitted from the guiding server to at least one wireless terminal in response to the route request. The position of the terminal is determined and the received route information is presented in the terminal so that supplementary data are presented when the terminal is in places with which the supplementary data are associated.

30 Claims, 4 Drawing Sheets

U.S. PATENT DOCUMENTS

| | | | |
|---|---|---|---|
| 5,543,789 A | 8/1996 | Behr et al. | |
| 5,751,245 A | 5/1998 | Janky et al. | |
| 5,758,313 A | 5/1998 | Shah et al. | |
| 5,808,566 A * | 9/1998 | Behr et al. | 340/995.12 |
| 5,848,375 A | 12/1998 | Nunobiki et al. | |
| 6,091,956 A | 7/2000 | Hollenberg | |
| 6,115,611 A | 9/2000 | Kimoto et al. | |
| 6,144,318 A | 11/2000 | Hayashi et al. | |
| 6,199,014 B1 | 3/2001 | Walker et al. | |
| 6,282,491 B1 | 8/2001 | Bochmann et al. | |
| 6,324,466 B1 | 11/2001 | Vieweg et al. | |
| 6,336,073 B1 | 1/2002 | Ihara et al. | |
| 6,347,278 B2 | 2/2002 | Ito | |
| 6,366,852 B2 | 4/2002 | Irie et al. | |
| 6,456,936 B1 | 9/2002 | Neukirchen et al. | |
| 6,484,033 B2 | 11/2002 | Murray | |
| 6,496,776 B1 | 12/2002 | Blumberg et al. | |
| 6,519,241 B1 | 2/2003 | Theimer | |
| 6,526,350 B2 | 2/2003 | Sekiyama | |
| 6,526,351 B2 | 2/2003 | Whitham | |
| 6,542,811 B2 | 4/2003 | Doi | |
| 6,625,457 B1 | 9/2003 | Raith | |
| 6,650,877 B1 | 11/2003 | Tarbouriech et al. | |
| 6,718,344 B2 | 4/2004 | Hirono | |
| 6,990,408 B2 | 1/2006 | Iwase et al. | |
| 7,050,905 B2 | 5/2006 | Nemeth | |
| 7,155,338 B2 * | 12/2006 | Kauvo et al. | 701/209 |
| 2001/0029459 A1 | 10/2001 | Fujiwara | |
| 2001/0044693 A1 | 11/2001 | Gotou et al. | |
| 2001/0051973 A1 | 12/2001 | Green et al. | |
| 2002/0040271 A1 * | 4/2002 | Park et al. | 701/209 |
| 2002/0059296 A1 | 5/2002 | Hayashi et al. | |
| 2002/0090943 A1 | 7/2002 | Kwon | |
| 2002/0137523 A1 | 9/2002 | Diggelen | |
| 2002/0138650 A1 | 9/2002 | Yamamoto et al. | |
| 2002/0173905 A1 | 11/2002 | Jin et al. | |
| 2003/0117316 A1 | 6/2003 | Tischer | |
| 2004/0110515 A1 | 6/2004 | Blumberg et al. | |

FOREIGN PATENT DOCUMENTS

| | | |
|---|---|---|
| EP | 0 955 521 | 11/1999 |
| GB | 2 335 492 | 9/1999 |
| GB | 2 360 588 | 9/2001 |
| JP | 07-225895 | 8/1995 |
| JP | 10-013961 | 1/1998 |
| JP | 10-339649 | 12/1998 |
| JP | 11-051671 | 2/1999 |
| JP | 11-094571 | 4/1999 |
| JP | 11-296074 | 10/1999 |
| JP | 2001-289662 | 10/2001 |
| WO | WO 01/71693 | 9/2001 |

* cited by examiner

PROVIDING GUIDING SERVICE BY MEANS OF A WIRELESS TERMINAL

CROSS-REFERENCE TO RELATED APPLICATIONS

This is a continuation application of application Ser. No. 10/324,312, filed Dec. 19, 2002, now U.S. Pat. No. 7,155,338, the content of which is incorporated herein by reference in its entirety.

FIELD OF THE INVENTION

The invention relates to guiding services provided by wireless terminals and particularly to determining routes and utilising them in wireless terminals.

BACKGROUND OF THE INVENTION

Various guiding services have been designed particularly for vehicles, where the location of a vehicle is typically observed and the position on the map is determined, which map can be displayed to a user. In some guiding systems implemented in vehicles, it is also possible that a user predetermines the destination he/she wants to go and the system selects a suitable predetermined route from the map. The user can be guided along the route by using voice commands or visual signs, for instance.

Some mobile stations also have positioning properties, which are arranged by providing a mobile station with a GPS receiver (Global Positioning System). With these mobile stations, it is possible to determine the position of a mobile station and to load maps into it, the maps showing the location and travelling direction of the mobile station on the basis of position information provided by the GPS receiver. A user may determine a point on the map he aims at, and by using route marks updated on the screen on the basis the position information, he may travel towards the destination. The user can mark several destinations on the map, and routes can be formed between them. There are also services, in which a map indicating a predetermined route is loaded for a guiding service that is used in a car, for instance. The user may use this route in order to travel to the desired destination.

It would be desirable, for instance, to determine a taken route to a cottage and to personally guide other friends who are coming to the cottage. However, this has not been possible in known guiding services provided by mobile stations. In some mobile stations, named map points can be sent to other mobile stations (of the same manufacturer and of the same model), but besides only the points shown on the map, it would be useful to offer other guiding information as well. By using conventional communicating means, a mobile station can naturally send additional guiding information for instance as short messages, but this is cumbersome.

BRIEF DESCRIPTION OF THE INVENTION

It is thus an object of the invention to provide a method and an apparatus implementing the method such that a wireless terminal can be provided with an improved guiding service, which may comprise personal information. The objects of the invention are achieved by a method, guiding system, wireless terminals, guiding server and computer program, which are characterized in what is stated in the independent claims. The preferred embodiments of the invention are disclosed in the dependent claims.

The invention is based on the fact that on the basis of the travelling of a wireless terminal, a guiding system determines route points on a route and a user of the terminal can initiate the recording of supplementary data which are used for providing information on the route. The supplementary data are typically associated with the position information of the route point at the time of recording. The system further comprises a guiding server which compiles and stores route information, which can be identified by a route identifier and it comprises at least a route formed by position information from the terminal and position-specific supplementary data. At the route usage phase, the guiding server selects the requested route information on the basis of the route identifier and transmits the requested route information to at least one wireless terminal. The terminal which has received the route determines its position and presents received route information to the user so that said supplementary data are presented when the terminal is situated in places with which supplementary data are associated. Supplementary data can be speech information, for instance, in which case supplementary data are presented by reproducing speech information by means of sound reproduction means of the terminal.

The method and apparatus of the invention provide the advantage that wireless terminals can be used for forming routes that are used by other wireless terminals. Routes may be stored in a centralised manner in servers which typically have a great memory capacity and which, by using supplementary data the user himself has added thereto, provide a lot of additional value for different guidance situations and make the guidance personal and flexible for different users, environments and situations. As the supplementary data are presented automatically in the right place, the user receives appropriate guidance at the right time and he need not look for the proper instruction among all guidance material received.

According to a preferred embodiment of the invention, a server determines the route points according to position information of the terminal into map data. The server also forms a route between the route points determined in the map data and adds the map data and at least one route determined therein to the route information. The terminal may provide the user with map data, route points determined in the map data and the route between them according to the location of the terminal at that moment. Thus, the terminal forming the route need not maintain map data, which typically require a lot of memory, but the server may add the necessary map material according to the route points.

According to a second preferred embodiment of the invention, the terminal can store audiovisual information, particularly photos of the environment or speech samples, and add the audiovisual information as supplementary data. These photos can be displayed and/or speech samples can be reproduced by a terminal using route information in places with which they are associated. By using supplementary data in this way, the guidance can be made very specific and personal and very clear guiding instructions can be given at important crossroads, for instance.

BRIEF DESCRIPTION OF THE FIGURES

The invention will now be described in greater detail in connection with preferred embodiments, with reference to the attached drawings, in which.

DETAILED DESCRIPTION OF THE INVENTION

Figure 1:
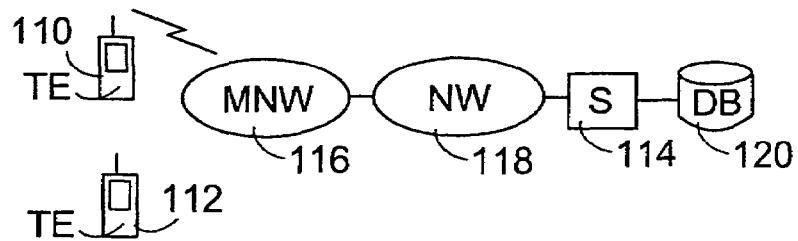
FIG. 1 shows a guiding system according to a preferred embodiment.

FIG. 1 shows a guiding system comprising at least one wireless terminal TE, a pair of which are shown as 110 and 112, and a guiding server S, denoted as 114, and an assorted data bank (DB) 120. The TE can be any wireless terminal, such as a mobile station, a PDA device, a portable computer or a terminal integrated into a vehicle. The TE can be connected to a wireless network MNW 116, which provides at least the connection necessary for data transmission. The MNW can be any prior art wireless network, such as a network which supports the GSM service, a network which supports the GPRS service (General Packet Radio Service), a third-generation mobile communication network, such as a UMTS network (Universal Mobile Telecommunications System), a wireless local area network WLAN or a short-range wireless network, such as a Bluetooth network. Also other circuit-switched or packet-switched networks NW 118, can exist between the TE and the S. The Internet can also be used between the network MNW and the network NW to which the S is connected, whereby data transmission employs the IP protocol (Internet Protocol) of the network layer and the reliable TCP (Transmission Control Protocol) or unreliable UDP protocol (User Datagram Protocol) of the transport layer.

Figure 2:
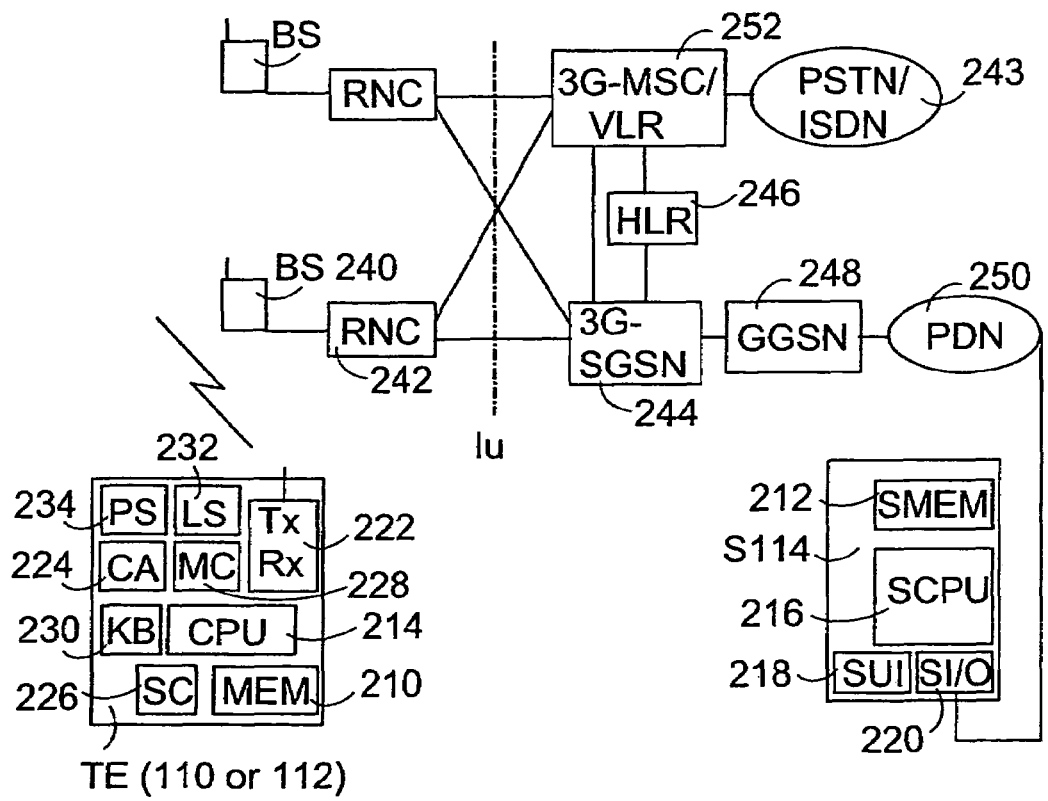
FIG. 2 illustrates elements of a wireless terminal and server in greater detail.
Figure 3A:
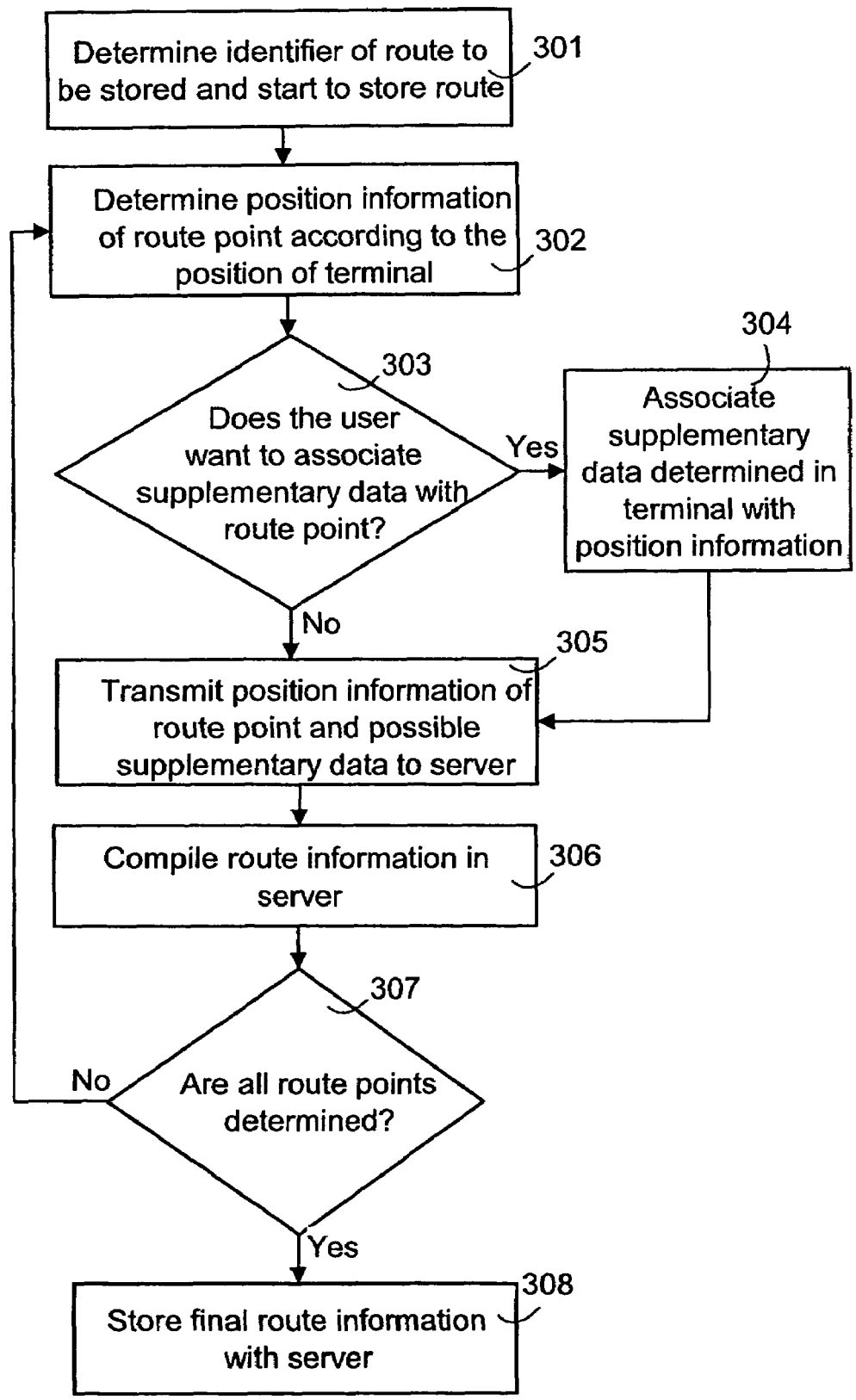
FIGS. 3a and 3b show a method of a preferred embodiment as a flow chart.
Figure 3B:
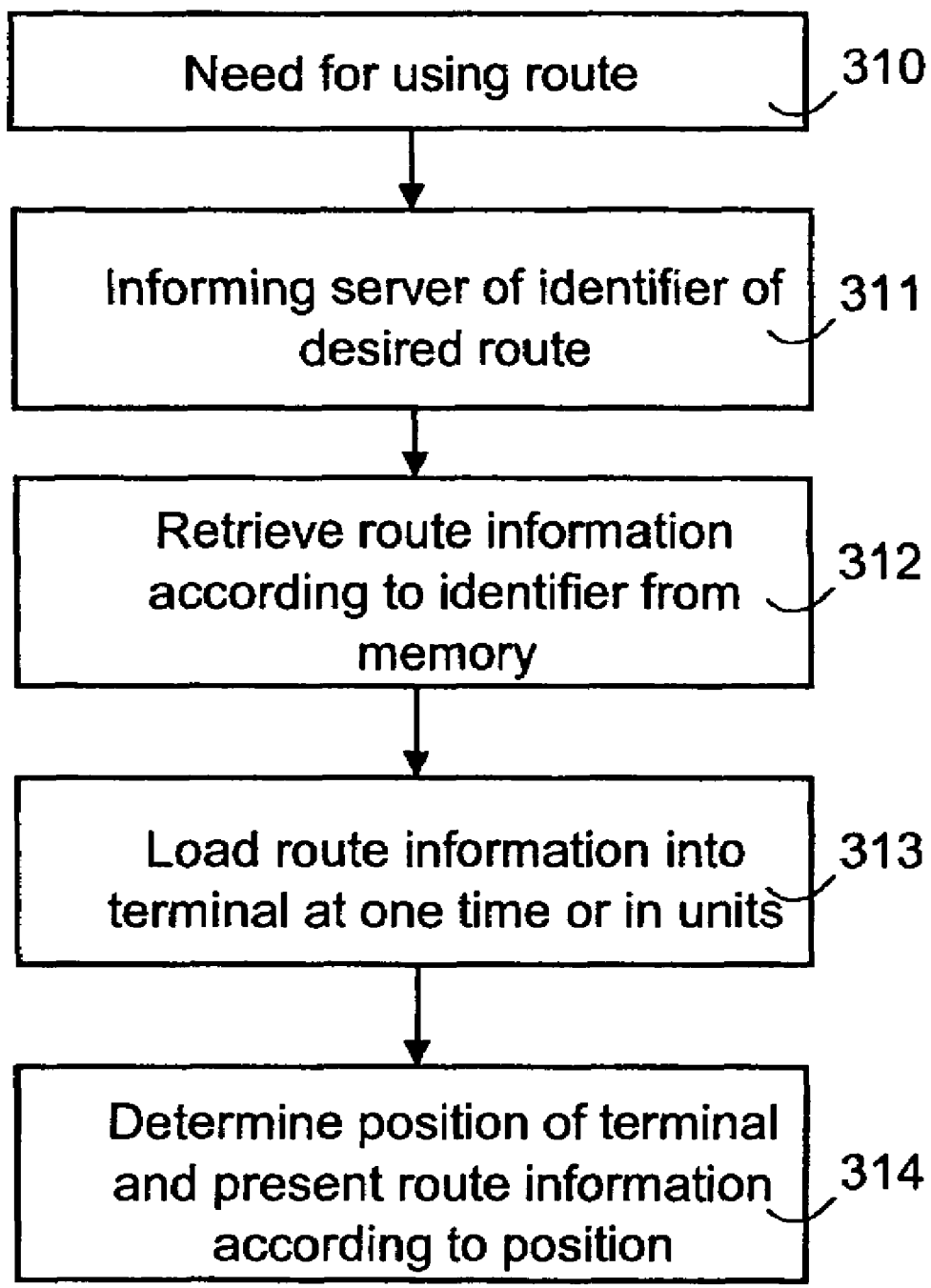

FIG. 2 illustrates elements of the server, S 114, and those of the wireless terminal, TE (110 or 112), in greater detail and according to an embodiment of the invention. The TE and the S respectively include memories MEM 210 and SMEM 212, and central processing units CPU 214 and SCPU 216 with one or more processors. The server, S 114, also includes at least one user interface, SUI 218, and data transmission means, SI/O 220. The memories MEM 210, and SMEM 212 include a non-volatile portion for storing applications controlling the central processing units CPU, 214 and SCPU 216 as well as other information to be maintained, and a volatile portion for temporary data processing. Computer program codes executable in the central processing units CPU 214 and SCPU 216 can be used for implementing inventive devices, i.e., applications for route determination, storage and usage, preferred embodiments of which are illustrated in FIGS. 3a and 3b. The computer program codes can be obtained via a network and/or stored in external memory means, such as a floppy disk, a CD ROM or other external memory means, from which they can be loaded into the memory MEM 210 and SMEM 212. The inventive means can also be implemented by using hardware solutions or a combination of hardware and software solutions.

A terminal TE according to a preferred embodiment comprises a transceiver (TxRx) 222 for arranging wireless data transmission with a base station or access point of a wireless network (MNW) 116, picture storage means (CA) 224 for taking, storing and forwarding still pictures or video pictures, a screen (SC) 226, and voice information storage means MC 228 for receiving and converting the user's speech information (microphone) and for recording it in the memory 210 and for forwarding it. The picture storage device (CA) 224 can be implemented by a camera and a computer program which is to be executed in the CPU and is configured to store picture data received from the camera (integrated into or separate from the terminal TE) in the memory 210 preferably in a highly compressed format, and to transmit them by using the transceiver 222. The TE also comprises other user interface means, such as a keyboard (KB) 230 and a loudspeaker LS 232. According to a preferred embodiment, the terminal TE also comprises positioning device (PS) 234, for determining its position, such as a satellite-based positioning device. The positioning device 234 can typically also be used for determining the travelling direction of the terminal TE. It is to be noted that the terminal TE does not necessarily comprise all devices illustrated in FIG. 2; the picture storage device CA, for instance, is not necessarily included in the terminal TE.

FIG. 2 also illustrates a network for a UMTS (universal mobile telecommunication system), by which wireless data transmission can be provided for the terminal TE. The UMTS comprises user equipment TE, base stations BS 240, (typically referred to as 'node Bs') and radio network controllers RNC 242 for controlling the base stations, which support an air interface according to a wideband code division multiple access technology, i.e., the WCDMA technology. The core network comprises a third-generation mobile switching centre 3GMSC/VLR 252 for circuit-switched connections via a PSTN/ISDN 243, a third-generation serving GPRS support node 3G-SGSN 244, a home location register (HLR) 246 for subscriber information and the like, and a gateway GPRS support node (GGSN) 248, for packet-switched data transmission via packet data network (PDN) 250.

FIGS. 3a and 3b show a method according to a preferred embodiment. FIG. 3a illustrates route determination. When the user of the terminal TE wants to determine a route, he preferably activates a route determination application executable in the central processing unit CPU from the terminal TE. The terminal TE then preferably sets up a connection 301 with the server S. The server S sends 301 a unique route identifier, by which the user controls the route, to the terminal TE. On the basis of the route identifier, the terminal TE user forming the route, i.e. the route former, can, for instance, name the route, supplement it later with background information, destroy it, etc. The server S may simultaneously inquire to whom the route is to be distributed, and the route former may then select the desired persons from his address book. The terminal TE can transmit the information on the receivers to the server S, which adds it to the route information. The receivers can be indicated, for instance, on the basis of the names selected from the address book and the MSISDN numbers (Mobile Subscriber ISDN) associated with them; also terminal identifiers, such as an IMEI code (International Mobile Equipment Identity), can be directly used. Route receivers can also be determined afterwards, when the entire route is ready.

After the route determination has been prepared, the terminal TE can start 301 to determine the route. A route consists of route points, which comprise position information (latitude, longitude and preferably also altitude) determining the exact position and an identifier, such as a number or a name given by the user. The position information of the route point is determined 302 according to the position of the terminal TE. According to the present embodiment, the terminal TE determines the position information of the route points. The route points can be determined automatically after the terminal TE has travelled a certain distance, for instance. Also the user can determine a route point when he sees an important guidance point, such as a crossroads. According to a preferred embodiment, also a time stamp is associated with the position information in step 302. The time information is obtained from the internal clock of the terminal TE or from an external source, such as the GPS.

By employing any positioning technology, the terminal TE can determine 302 its position by means of positioning means PS shown in FIG. 2. A well-known positioning technology is GPS positioning, in which a GPS receiver has been integrated into the terminal TE. The method is accurate especially outdoors, but it does not work indoors, however. The costs of the terminal can be reduced by employing an A-GPS method (Assisted GPS), in which part of the functions (such as position calculation) are carried out by the network (MNW), but this naturally means that changes have to be made to the network.

After the position information of the route point has been determined, it is checked 303 whether the user wishes to associate the route point with some supplementary data. In step 303, the user may select from the terminal TE a function, according to which supplementary data can be associated with the route point, or the route determination application of the TE can actively inquire of the user whether he wishes to associate additional information with the route point. If the user wishes to add supplementary data, the supplementary data selected/added by the user are associated 304 with the position information determined by the route point. It is possible that the user has predetermined that the supplementary data are associated with one or more route points automatically.

Supplementary data may include, for instance, a stored photo of the environment, stored audio data on the user's speech or a text sequence entered by the user. Depending on the properties of the terminal, supplementary data may comprise one or more data types (speech data/video picture/still picture/textual data) and storage formats. By employing technologies known per se, supplementary data can be recorded and the obtained supplementary data (supplementary file) can be stored in the memory. Using these supplementary data in the route determination application is novel. Depending on the type of the supplementary data to be recorded, the route determination application receives data, forming the supplementary data to be associated with at least one route point, from the voice information storage means MC/picture storage means CA/keyboard KB (textual data may also be obtained from a touch screen or a speech signal, for instance). Consequently, a person using the route can be provided with a wide variety of additional information; for instance, he can be informed of a clearly visible landmark or a pleasant café. If the terminal TE is used for taking a photo of the environment, the photo is preferably also supplemented with heading information at the moment the photo is taken, indicating the direction in which the photo is taken. If it is the TE that determines 302 the position information of the route points, it can also associate 304 the supplementary data with the route points.

After the route point has been determined and the possible supplementary data have been associated, the TE sends 305 the position information and the supplementary data to the server S. At the application level, the information can be formed into a packet comprising the route point information, which is illustrated in greater detail below in connection with FIG. 4.

As the server S receives the information of the new route point, it binds 306 the route point to previous route points associated with the same route according to the route identifier and compiles route information. The route information compiled 306 by the server S comprises at least the position information and supplementary data received from the terminal TE, but the server S may also add other guiding information. According to a preferred embodiment, in step 306 the server S determines the position of the route point on the map and adds map information to the route information. This can be implemented, for instance, such that the server S obtains a map on which the route point is marked and illustrating the environment of the route point from a map database or a map server. This map can be added to the route information and at the same time, the following route points are preferably added to the map. Typically the route is formed on the basis of a road map, whereupon several road options can exist between the route points. The server S can also determine one or more route alternatives between the received route point and one or more previous route points. Thus, the shortest route, for instance, can be determined on the map. On the basis of the position information, the server can retrieve the names of streets on which one has travelled, and these names can be added to the route information. On the basis of the route determined on the map, the server S can supplement the route information with different guiding information, such as visual arrows or speech instructions, which guide the user on the route especially at crossroads. Also distance information can be added to the route information. The server S can compare the time stamp of the route point with the time stamps of the previous route points, calculate travelling time information and add travelling time information to the route information.

This provides the advantage that it is possible to start using the route points soon after they have been transferred to the server S, which means that, if required, the server S can form the route 'piece by piece' and the route can be utilized (FIG. 3*b*) even though it were not completely ready yet.

After the position information has been transferred 305 and the route point has been added 306, it is checked 307 whether the entire route has now been determined, i.e. whether the user still wants to determine new route points. The user may be inquired whether he still wants to add route points, and, on the basis of the answer, the process advances to either step 302 or 308. It is also possible that the route is interpreted as determined when the user stops using the route determination application. Furthermore, it is possible that in the beginning (301), the user has determined a target route point and after the TE has reached the target route point, it is automatically interpreted that the route is determined. If all route points have not yet been determined at the next route point, the process returns to step 302 where the position information of the route point is determined. After all route points have been determined, the server S may finish the route information determining the route and store 308 it, identified by its route identifier, in its memory SMEM or in a separate database DB. The server S may then provide the route information with an end point and, for instance, determine the total distance and time between the starting and end point. The route information can be stored by employing any technology, for instance as an XML file (Extensible Markup Language), from which there are, if required, links to other files, particularly to image and speech files providing supplementary data.

Unlike in FIG. 3*a*, position information of all route points and the possible supplementary data associated with them can be stored in the memory of the terminal TE and they can be transmitted to the server S only after all route points the user needs have been determined. Steps 305 and 306 are thus left out, and the server S forms the route on the basis of all route points that are received from the terminal TE at the same time, and stores it to be available for other terminals. This embodiment provides the advantage that the route-related information can be transferred at one time, which is typically more cost-efficient for the user than to transfer information associated with each route point separately.

FIG. 3b illustrates how a stored route is used. Typically, route information is used by other terminals than those that have formed the route, but naturally a terminal which uses the route can also be the terminal which has determined the route. There may be a need for using a certain route 310 when the user of the terminal TE wants to load the route into his terminal, for instance when a friend has informed that he has stored the route information to be used for guidance with a certain route identifier in the server. According to a preferred embodiment, already when the route is being formed (FIG. 3a), the terminal TE or the server S transmits a delivery message to the terminals TE which are used by the persons determined to use the route. This delivery message may be a text message, for instance, which includes at least a route identifier and possibly some route description. The delivery message can be sent after the route has been stored 307 or even earlier. The delivery message can be transmitted, for instance, as a short message on the basis of the MSISDN numbers stored in the telephone book of the TE, in which case, by utilising the subscriber register of the mobile communication network MNW, the delivery message can be directed at the proper receivers by means of a well-known GSM technology, for instance.

The route identifier entered by the user or included in the delivery message received by the TE is selected as a route to be requested, and a route request comprising at least the route identifier is transmitted 311 from the terminal TE requiring the route to the server S. The delivery message can also be transmitted in step 311 from the terminal forming the route to the server S, in which case the server S can automatically transmit the route identifier of the delivery message to the terminals directly or indirectly determined in the route information. Route receivers can be determined as early as during the route determination illustrated in FIG. 3a, whereby the server S can automatically start to transmit route information to the receivers on the basis of the request transmitted in FIG. 3a (and indicated in step 301, for instance). The request 311 can also be received from a third party, which is not necessarily a wireless terminal.

On the basis of the received identifier, the server S retrieves 312 the requested route from its memory SMEM or from the database DB. If the server S charges the terminal TE for the route transmission, it may also require that identification data of the user and/or terminal are transmitted before the route information can be transferred to the terminal TE. The route information is transferred 313 in its entirety either at one time or in units to the terminal TE. Route information can be transferred in units, for instance, so that on the basis of the position of the terminal TE, a new route information packet is transferred, guiding the user to the next route point, for instance. Thus, the transmission of the route information (313) may be based on requests which the TE has transmitted and which possibly include the position information of the terminal TE. Based on the position information, the server S can select such route information that is useful for the terminal TE in its environment. At any stage, the user of the terminal TE can browse the received route information. The user can, for instance, study the entire route on the map, before he starts driving.

According to a preferred embodiment, the terminal TE utilising the guiding service continually determines 314 the position of the terminal TE so that the received route information can be used for presenting guiding information which is in accordance with the position at that moment. For instance, the user can activate the route usage application when he starts his trip. Received route information is presented 314 to the user so that the supplementary data are presented when the terminal is in places with which the supplementary data are associated. The terminal TE, i.e. preferably the route usage application executable in the processing unit CPU of the terminal, thus compares the position information obtained from the positioning means PS with the position information included in the received route information and updates the route information, especially the screen SC, which is shown to the user, on the basis of the position at that moment. If route information comprises map data, the route points and the route the user has taken can be shown to the user on the map. It is also possible to add the route points to the maps of the terminal TE on the basis of the received position information. At least road names of the route, preferably added by the server S, can be displayed directly on the map or on a separate text display. Supplementary data and other guiding information added by the server S are presented when the TE is substantially (within a determined range of variation) in a place with which they are associated. For instance, guiding information which the server S has added to relate to crossroads is presented in places determined by the server S, even though they were not the route points determined by the terminal. The supplementary data associated with the route points in the terminal (step 304, FIG. 3a) are preferably presented automatically via the user interface (screen SC or earpieces) of the TE, when the terminal TE is, according to the position information comparison, substantially at a route point. The terminal TE can draw the user's attention to the next route point by vibration or a tone, by blinking the screen or by a combination thereof.

According to an alternative embodiment, the terminal TE does not comprise positioning means PS, and so all route information can be loaded into it at one time in step 313. The terminal TE thus shows 314 the route information so that the supplementary data are presented at the proper route points but the route information is not updated according to the position of the terminal TE. It is possible that, for instance, on the basis of the position information of the TE obtained from the mobile communication network MNW, the server S transmits route information in units 313 so that the TE can always present proper guiding information.

According to a preferred embodiment, route information can be adapted according to the properties of the terminal TE. In step 311, the TE may thus also transmit information on the properties. The server S adapts the route information in step 312 so that only supplementary data supported by the terminal TE are transmitted to it. For instance, pictures can be left out, if the terminal does not support the display of pictures. It is also possible that the server S (or a converter it uses) converts one or more content formats of the route information so that the information is in the format supported by the TE. For instance, pictures are converted into a JPEG format (Joint Photographic Experts Group) before they are transmitted. The size or colour depth of pictures can also be changed. Speech data can also be adapted into a different format, for instance. The terminal TE may have a memory restriction to the size of the route information to be received, and the server thus controls that the size of the route information to be sent does not exceed the limit. When the route information is adapted, the properties of the user interface of the terminal TE can be taken into account before the transmission: for instance, pictures are reduced to the size of the screen SC in advance. In this way, only such route information that the terminal TE can utilize is transmitted to it. In this embodiment, different terminal classes can be formed, or, for instance, the file formats which are supported by the terminal TE can be indicated in step 310. To indicate terminal properties, user agent profile functions defined in the WAP protocol, for instance, can be used. The properties of the terminal TE can also be stored in the network, such as in a database DB maintained by the server S or in the mobile communication network MNW (e.g. home location register HLR), from which the server S can obtain them. This embodiment improves the reliability of the guiding service and reduces error situations, which are unpleasant to the user. Thus, the guiding service can, by using e.g. an XML storage format, support a wide variety of terminals TE, and thus route information need not be stored separately for each different terminal.

It is also possible that the user indicates (step 311), which kind of information the route should contain. The server S then adapts the route information according to the wishes of the user. He may, for instance, leave out the pictures in order to cut down data transmission costs. User preferences can be predetermined in the application of the terminal TE providing the guiding service, and so the user need not personally select them each time. Also the manner in which the route information is loaded can be selected according to user- or terminal-specific settings, and so the user may want to receive all route information at one time, for instance.

According to a preferred embodiment, route information can be used even though the final route information were not stored yet (step 308 of FIG. 3a has not been achieved). This can be referred to as 'Follow me'—function in which the route can be used for guiding before the route former has reached his destination. Thus, route information can be updated for the receiving terminal (step 313) and it can be utilized (step 314) as soon as the server obtains information on a new route point (step 306 in FIG. 3a).

The position of the terminal TE can also be determined in the network or in the network and terminal in step 302. According to an embodiment, the position of the terminal TE in step 302 is determined in the mobile communication network MNW. The terminal TE can thus transmit an indication when the route point should be determined to the network MNW. The MNW then transmits the position information to the server S, which determines the route on the basis of the method illustrated in FIG. 3a. Also the supplementary data stored in the terminal TE are transmitted to the server S, which associates 304 them with the desired position information (route points) on the basis of the time information.

One network-based positioning method is the positioning according to a cell identification (=Cell ID), whereby the network determines the position of a terminal according to the cell in which the terminal has registered. The method provides the advantage that no changes are required to the network or terminals, but the accuracy is poor in areas where cells are big, such as on the countryside. In cities, too, the accuracy is only about a couple of hundreds of meters. Another network-based positioning method is 'Time of Arrival' (TOA), in which at least three fixed base stations (BS) of the network measure propagation delays of the signal transmitted from a terminal, by which delays the position of the terminal can be calculated accurately. The method is, however, quite expensive. E-OTD (Enhanced Observed Time Difference) is an example of a positioning method, which uses both a network and a terminal. In this method, the terminal measures the time delay of a signal which is supplied from at least three base stations. The system also comprises an equal number of location measurement units (LMU) and base stations and they are usually also located in connection with each other. The LMU also measures the propagation delay of the signal supplied from the BS, and, because the location of the LMU is known, the position of the terminal can be calculated on the basis of the difference between the propagation delays measured by the terminal and the LMU. This method allows a positioning accuracy of about hundred meters to be achieved in the GSM network, and the accuracy is expected to improve in the third-generation mobile communication networks.

According to a preferred embodiment, position information can also be associated (in step 302) with heading information, which is typically the direction in which the route former travels. The heading information can also relate to a route point, which means that it can indicate in which direction the route point is. The heading information can be determined, for instance, by means of the used positioning system, if it is technically capable thereof, or by means of a device providing heading information and connected to or integrated into the terminal TE. As was mentioned above, heading information can be associated with the photos that are taken, and so when a photo is taken, the direction at which it is taken can be determined and the heading information can be utilized when the photo is displayed.

Figure 4:
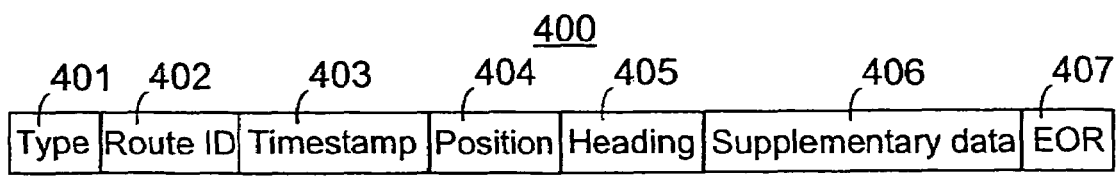
FIG. 4 illustrates a guiding information packet according to a preferred embodiment.

With reference to FIG. 4, when a route is stored, a uniform route information entity according to a preferred embodiment, which can be called a route information packet 400, comprises the following information fields: type 401, route ID 402, time stamp 403, position 404, heading 405 and supplementary data 406. The packet type determines the packet content, which varies according to the terminal properties. On the basis of the route identifier Route ID, the information of the packet is added to other route information compiled by the server S. The time stamp can be used by the server S for forming route information. The position information may be included, depending on whether the positioning is carried out in the terminal or in the network, whereby the server obtains position information of the terminal from elsewhere by using the time stamp. The availability of the heading information depends on the terminal and the field may thus be entirely absent. The supplementary data may comprise, for instance, digital photographic or moving pictures, audio data, icons or animations, depending on the properties of the terminal TE. One route information packet may transfer information of several route points, whereby a route ID, time stamp, position, heading, and supplementary data can be created for each route point or the route points can be distinguished by route point identifiers and a route point identifier with which the supplementary data are associated can be indicated in the supplementary data. The EOR field (End Of Route) 407 of the packet can indicate to the server S that the route point according to the position information of the packet is the end point of the route. It is possible that in addition to what is shown in FIG. 4, the packet also comprises information on the route receivers. The route determination application collects the packets shown in FIG. 4 and transmits them to the lower protocol layers for transport. The packet format illustrated in FIG. 4 can be utilized both at the route determination stage and at the route usage stage, i.e., in addition to step 305 of FIG. 3a, also in step 313 of FIG. 3b.

Data shown in FIG. 4 can be transferred by using any data transmission service. Packet-switched as well as short message services are naturally particularly suitable for transferring guiding data, because they reserve data transmission capacity only when data are transferred, which means that particularly at the route determination stage, the capacity of the network MNW is used more efficiently (than in a conventional circuit-switched data call) and the transmission can also be more cost-efficient to the user. Between the mobile communication network MNW and the server S, data can be transferred by utilising, for instance, a TCP/IP stack and a SMTP protocol (Simple Mail Transfer Protocol). In the mobile communication network MNW, properties provided by the WAP protocol (Wireless Application Protocol), for instance, can be utilised. A multimedia messaging service (MMS) is a service which is particularly suitable for transferring these data in the mobile communication network MNW. The terminal TE then comprises an MMS client device functionality and the mobile communication network (or another network) comprises an MMS server (MMS Relay/Server). The MMS server transfers MMS messages to the terminal TE and from the terminal TE to the server S. The server S does not necessarily support MMS messages (does not comprise an MMS client functionality), wherefore the MMS server must convert multimedia messages for the server S into another format, such as a format defined in the SMTP or HTTP protocol (Hypertext Transfer Protocol), and vice versa. The MMS service can be implemented on top of a customized WAP stack, for instance, or by means of an IP-based solution. As to more specific details of the MMS service, a reference is made to the 3GPP specification TS 23.140 v. 5.0.0 *"Multimedia Messaging Service (MMS); Functional Description; Stage 2"*, September 2001.

Data shown in FIG. 4 can also be transferred in separate packets; supplementary data, for instance, can be transferred separately from other information. Position and heading information requiring little space can thus be transferred by using a short message, for instance, and information which typically requires more space by using a packet-switched GPRS service, for instance.

MPTP (Mobile Phone Telematics Protocol) is a protocol which has been designed for telematics applications of mobile stations. It is a protocol which arranges the transmission of position information between the terminal TE and the server S. The position information can be transferred between the TE and the S supporting the MPTP protocol by using a short message, for instance. The MPTP does not, however, support the transmission of supplementary data; in addition to the route point name, it can only transfer the icon representing the route point on the display. The terminal TE and the server S are arranged to process supplementary data in a manner illustrated above and to transfer them by means of the MMS protocol, for instance. If the supplementary data are transferred separately from other route information, the message delivering supplementary data must indicate at least the route identifier and some kind of route point identifier (or the exact position information) so that the server S and the terminal TE utilising the route information can associate the supplementary data with the proper route point.

According to an embodiment, route points and/or supplementary data associated with a route point can also be adapted/added later, i.e. when the terminal TE is located somewhere else than at the route point. Later on, for instance after the entire route has been stored (after step 308), the user may thus add useful information or he can correct erroneous guiding information. When the route information has been stored by the server S, the adaptation of the route information is possibly arranged by a browser utilising Internet technologies. Thus, the server S can act as a WWW server (or, if it is a WAP connection, as a WAP server) executing the HTTP protocol and it can transfer route information in an HTML format to the terminal TE. The user is thus able to modify the route information from any computer that can be connected to the Internet and comprises a WWW browser. The TE can modify the route information, and the server S modifies the route information it has stored on the basis of the modifications received from the TE. The route information can thus be loaded over the Internet into other kinds of terminals as well, such as into a desktop computer. If there is a WAP connection between the server S and the terminal TE, route information can be transferred in a WML format (Wireless Markup Language). A WAP gateway converting the HTML format into the WML format and vice versa can also be connected between the server S and the terminal TE.

According to a further embodiment, access rights can be determined for the route information. Route information can be determined as private, which means that only the user forming the route and the receiver determined by the user can utilise it, i.e. load route information from the server S or modify it afterwards. On the other hand, route information can be determined as public, and anyone can utilise it from the server S. Access rights can be further specified to usage rights and modification rights, and access rights can determine different user groups. Different kind of route information can be allocated to different user groups. It is mainly the route former who determines the access rights, but also the server S can modify access rights. If the route information is determined as private, the server S must identify the terminal user requiring route information, for instance, by a telephone number, the checking carried out by a third party or by checking a separate user identity and password. Such checking must be carried out in step 311 of FIG. 3b and in cases where the route information is to be modified over the Internet in a manner described above.

Figure 5:
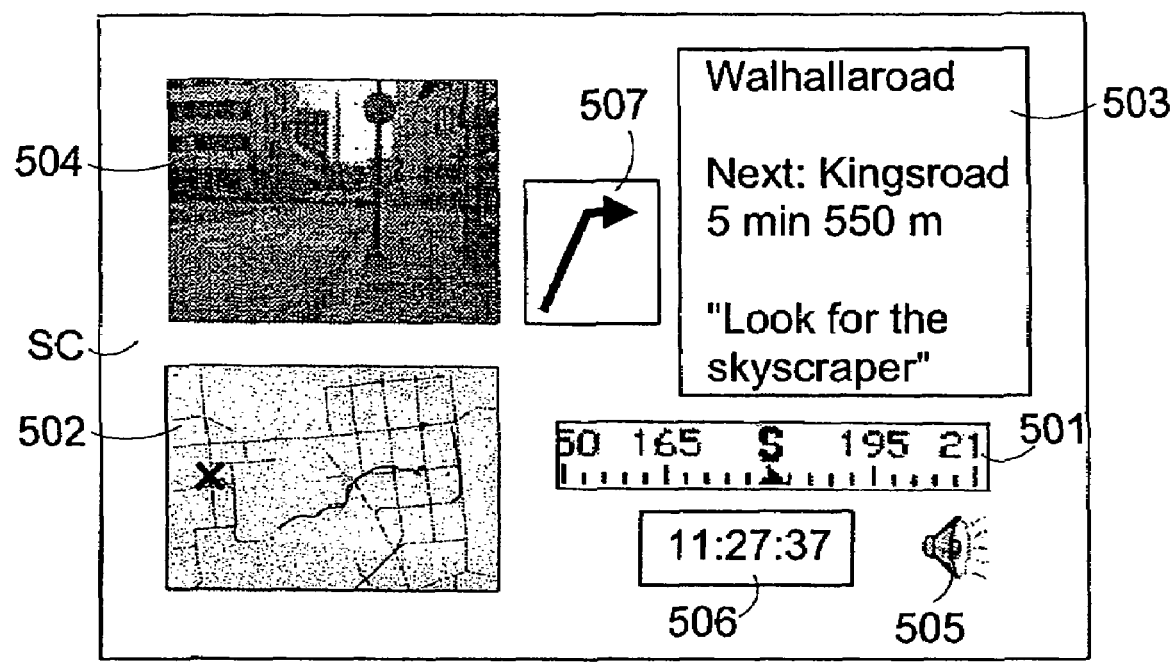
FIG. 5 illustrates guiding information, which can be presented to a user.

FIG. 5 illustrates guiding information, which can be displayed to the terminal TE user on the screen SC. The screen SC can display heading information 501, the location of the user and the taken route on a map 502, textual information 503, such as the name of the road on which the user is and the name of and distance to the next road. Textual information 503 may also include supplementary data added by the user. The user may also add a photo 504 and speech information, which can also be indicated 505 on the screen SC. When the user selects speech information 505 from the screen SC, the speech information can be reproduced through a loudspeaker (this can also be done automatically without user intervention). The screen SC can also display the time 506 and guiding information added by the server, such as an arrow 507.

It is obvious to a person skilled in the art that as technology develops, the basic idea of the invention can be implemented in a variety of ways. The invention and the embodiments thereof are thus not restricted to the above examples but they may vary within the scope of the claims.

The invention claimed is:

1. A method comprising:
    specifying or receiving a route identifier for identifying a route of multiple route points determined on the basis of position information of a mobile device, and
    transmitting the route identifier to a wireless terminal associating route points with supplementary data, or to a wireless terminal for route selection and request by the wireless terminal.

2. A method as claimed in claim 1, wherein the method is applied in a wireless terminal configured to define route points and supplementary data for route points, and the wireless terminal transmits the route identifier to identify a particular route for another wireless terminal to be guided.

3. A method as claimed in claim 1, wherein the method is applied by a guiding server configured to select route information according to the route identifier indicated in a request received from the wireless terminal.

4. A method as claimed in claim 1, wherein the route identifier is transmitted to the wireless terminal in a delivery message.

5. A method as claimed in claim 1, wherein a route description is transmitted to the wireless terminal.

6. A communications device comprising memory, a processing unit and a transmission unit, wherein the communications device is configured to specify or receive a route identifier for identifying a route of multiple route points determined on he basis of position information of a mobile device, and
the communications device is configured to transmit the route identifier to a wireless terminal associating route points with supplementary data, or to a wireless terminal for route selection and request by the wireless terminal.

7. A communications device as claimed in claim 6, wherein the communications device is a wireless terminal configured to define route points and supplementary data for route points, and
the communications device is configured to transmit the route identifier to identify a particular route for another wireless terminal to be guided.

8. A communications device as claimed in claim 6, wherein the communications device is a guiding server configured to select route information according to the route identifier indicated in a request received from the wireless terminal.

9. A communications device as claimed in claim 6, wherein the communications device is configured to transmit the route identifier to the wireless terminal in a delivery message.

10. A communications device as claimed in claim 6, wherein the communications device is further configured to transmit route description to the wireless terminal.

11. A communications device as claimed in claim 6, wherein the communications device is a guiding server configured to compile and store route information, which route information is identified by the route identifier and it comprises at least a route formed by position information of the terminal and position-specific supplementary data received from the terminal.

12. A method comprising:
receiving a route identifier for identifying a route of multiple route points determined on the basis of position information of a mobile device, route information of the route comprising route point information and position-specific supplementary data, and
controlling a route and defining route points and supplementary data for route points for the route on the basis of the received route identifier, or
selecting a desired route on the basis of the received route identifier.

13. A method as claimed in claim 12, wherein the route identifier is received from a second wireless terminal.

14. A method as claimed in claim 13, wherein a route description is received from the second wireless terminal.

15. A method as claimed in claim 12, wherein a route request including the received route identifier is specified and transmitted.

16. A wireless communications device comprising memory, a processing unit and a receiver for wireless data reception, wherein the wireless communications device is configured to receive a route identifier for identifying a route of multiple route points determined on the basis of position information of a mobile device, route information of the route comprising route point information and position-specific supplementary data, and
the wireless communications device is configured to control a route and to define route points and supplementary data for route points for the route on the basis of the received route identifier, or
the wireless communications device is configured to select a desired route based on the received route identifier.

17. A wireless communications device as claimed in claim 16, wherein the wireless communications device is configured to receive the route identifier from a second wireless terminal.

18. A wireless communications device as claimed in claim 17, wherein the wireless communications device is configured to receive route description from the second wireless terminal.

19. A wireless communications device as claimed in claim 18, wherein the wireless communications device is configured to specify and transmit a route request including the received route identifier.

20. A wireless terminal comprising a control unit and memory for storing computer program code for controlling the control unit, wherein
the wireless terminal is configured to determine its position information,
the wireless terminal is configured to store supplementary data,
the wireless terminal is configured to associate the supplementary data with the position information of one or more route points, and
the wireless terminal is configured to transmit position-specific supplementary data and position information to a server.

21. A wireless terminal as claimed in claim 20, wherein the supplementary data comprise at least one of the following: stored picture information on the environment, recorded speech information of the user or a text sequence entered by the user.

22. A wireless terminal as claimed in claim 20, wherein the wireless terminal is configured to transmit the position-specific supplementary data and the position information to the guiding server only after all route points a user needs have been determined.

23. A wireless terminal as claimed in claim 20, wherein the wireless terminal is configured to associate a time stamp with the position information.

24. A wireless terminal as claimed in claim 20, wherein the wireless terminal further comprises an imaging unit for capturing an image of the environment, wherein
the wireless terminal is configured to store a captured image in said supplementary data,
the wireless terminal is configured to determine heading information of the wireless terminal at the moment the image is taken, and
the wireless terminal is configured to associate the heading information with the image.

25. A wireless terminal as claimed in claim 20, wherein the wireless terminal is configured to communicate with the server to modify or add information related to a route point stored by the server after the transmission of the position-specific supplementary data and position information.

26. A wireless terminal as claimed in claim 20, wherein the wireless terminal is configured to define route point information until a target route point specified by a user of the terminal is reached.

27. A wireless terminal as claimed in claim 20, wherein the wireless terminal is configured to define an end of route indicator in a route information data element to the server for indicating end of the route.

28. A wireless terminal as claimed in claim 20, wherein the wireless terminal is configured to transmit position-specific supplementary data and position information to the server by utilizing a messaging service for multimedia message transfer over a packet-switched data transmission service.

29. A computer program embodied on a computer-readable medium, said computer program comprising program code for causing a wireless terminal to:
- determine its position information,
- store supplementary data,
- associate the supplementary data with the position information of one or more route points, and
- transmit position-specific supplementary data and position information to a guiding server.

30. A computer program as claimed in claim 29, the computer program comprising program code for causing the wireless terminal to associate a time stamp with the position information.

* * * * *

UNITED STATES PATENT AND TRADEMARK OFFICE
CERTIFICATE OF CORRECTION

PATENT NO. : 7,412,327 B2  Page 1 of 1
APPLICATION NO. : 11/606240
DATED : August 12, 2008
INVENTOR(S) : Kauvo et al.

It is certified that error appears in the above-identified patent and that said Letters Patent is hereby corrected as shown below:

On the Title page, Item -57-

At line 13, "that supplemen-" should read --that said supplemen- --.

Claim 6 at column 13, line 5, "on he basis" should read --on the basis--.

Signed and Sealed this

Eleventh Day of November, 2008

JON W. DUDAS
*Director of the United States Patent and Trademark Office*